(12) United States Patent
Kirschbaum et al.

(10) Patent No.: US 10,447,630 B2
(45) Date of Patent: Oct. 15, 2019

(54) METHOD AND SYSTEM FOR ANONYMOUS AND SECURE SOCIAL LINKING DURING AN EVENT

(71) Applicant: Orange, Paris (FR)

(72) Inventors: Patrick Kirschbaum, Poigny la Foret (FR); Arnaud Brun, Boulogne Billancourt (FR)

(73) Assignee: Orange, Paris (FR)

( * ) Notice: Subject to any disclaimer, the term of this patent is extended or adjusted under 35 U.S.C. 154(b) by 158 days.

(21) Appl. No.: 15/249,212

(22) Filed: Aug. 26, 2016

(65) Prior Publication Data
US 2017/0063754 A1 Mar. 2, 2017

(30) Foreign Application Priority Data
Aug. 28, 2015 (FR) ..................... 15 58012

(51) Int. Cl.
| | | |
|---|---|---|
| *G06F 15/16* | (2006.01) | |
| *H04L 12/58* | (2006.01) | |
| *H04W 4/14* | (2009.01) | |
| *H04L 29/08* | (2006.01) | |
| *H04W 88/02* | (2009.01) | |

(52) U.S. Cl.
CPC .............. *H04L 51/10* (2013.01); *H04L 51/32* (2013.01); *H04L 67/02* (2013.01); *H04W 4/14* (2013.01); *H04W 88/02* (2013.01)

(58) Field of Classification Search
CPC ......... H04L 12/58; H04L 29/08; H04L 51/32; H04L 51/10; H04L 67/02; H04W 4/01; H04W 88/02; H04W 4/02
See application file for complete search history.

(56) References Cited

U.S. PATENT DOCUMENTS

| | | | | |
|---|---|---|---|---|
| 2004/0185881 A1* | 9/2004 | Lee | .......................... | A63F 13/12 455/466 |
| 2004/0203900 A1* | 10/2004 | Cedervall | ............... | H04L 29/06 455/456.1 |
| 2004/0235493 A1* | 11/2004 | Ekerborn | ................ | H04W 4/02 455/456.1 |
| 2006/0172744 A1* | 8/2006 | Tornkvist | ................ | H04W 4/02 455/456.1 |
| 2012/0276919 A1* | 11/2012 | Bi | .......................... | H04W 48/04 455/456.1 |

FOREIGN PATENT DOCUMENTS

| | | | |
|---|---|---|---|
| WO | WO 2008/022198 A2 | 2/2008 | |
| WO | WO 2008/022198 A3 | 2/2008 | |
| WO | WO 2012/167941 A1 | 12/2012 | |

OTHER PUBLICATIONS

European Search Report dated Sep. 26, 2016 from related application EPO 16185952.5.
French Search Report dated May 20, 2016, from related application FR1558012.

* cited by examiner

*Primary Examiner* — Benjamin M Thieu
(74) *Attorney, Agent, or Firm* — Knobbe, Martens, Olson & Bear, LLP

(57) ABSTRACT

One embodiment relates to a method for linking a mobile terminal of a first user and at least one mobile terminal of a second user via at least one server of a communications service provider via a platform configured to be connected to a mobile network.

15 Claims, 5 Drawing Sheets

METHOD AND SYSTEM FOR ANONYMOUS AND SECURE SOCIAL LINKING DURING AN EVENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, the disclosure of French Patent Application FR 1558012, filed Aug. 28, 2015, is incorporated herein by reference in its entirety.

BACKGROUND OF THE INVENTION

Field of the Invention

Some embodiments relate to the general field of telecommunications.

Some embodiments described herein relate to the secure management of the provision of a location-based communication service between two mobile terminal users, delivered by a server of a service provider. In particular, some embodiments described herein relate to a method for secure exchanges between the mobile terminals of two users via a services platform as a function of location information.

Description of the Related Art

Many mobile services currently use location-based to propose personalized services to the user of a mobile phone as a function of his location. But obtaining such location information of the mobile phone by service application generally requires the consent of the user. This has several disadvantages. First of all, such consent generally requires voluntary action of the user, in the form of text to be read, box to tick, button to click etc. . . . . This requires time, consumes resources and can push a user to abandon the use of such a service. On the other hand, the location of the user can be considered by the latter as a sensitive datum, too personal to be shared with others, more importantly with a sometimes commercial mobile service; all the more so since transfer of location-based data to a mobile service provider generally passes via the Internet network, not very secure, exposing these data to possible hacking by unscrupulous individuals, during their transfer or their storage on the provider servers. The user can consider that the confidentiality of his personal data is not guaranteed. For this reason some users can be encouraged to abandon use of a mobile service rather than confide location-based data in it. Finally, presentation of a request for consent to share location-based data and mobile applications using such data generally requires the display of an evolved graphic interface, for example to display a considerable quantity of text such as conditions of use, or else cartographic data. Because of this, the majority of current mobile applications using location-based can be used only on mobile phones fitted with large screens, such as "smartphones", depriving owners of mobile phones with small screens of such applications.

There is a need for a communication solution enabling a service provider to communicate with a mobile phone to provide it with a service as a function of the location-based zone of this mobile phone, without requesting the user for consent for transmission of location-based data.

Among services offered by existing service providers are linking services between various users of these services. Such services are proposed by various social network or instant communications applications. During an event such as a trade fair or a festival such applications can be employed to link participants to such an event. However, existing applications generally require identification of the user with the service provider and the identity of the user is generally shared with other users to whom the user is linked. This enables solicitation of the user by the provider of the service or by other users outside the site and duration of the event in which the user is participating, impinging on his private life.

There is therefore also a need for a solution to secure exchanges between two mobile phones, so that neither the provider of the communications service nor the other users ever has knowledge, both of the position and identity of a user of a mobile phone, and the private life of the latter is respected.

SUMMARY OF THE INVENTION

Some embodiments described herein relate to a method for linking a mobile terminal of a first user and of at least one mobile terminal of a second user via at least one server of a communications service provider using a platform configured to be connected to a mobile network, said mobile terminals being configured to be connected to the mobile network. The method comprises the following processes performed by the platform having a list of at least one service, each service being linked to at least one geographic availability zone:

obtaining via the mobile network of first information of the location zone of the mobile terminal of the first user and of a first alias datum determined from a user identifier linked to the mobile terminal of the first user, as a function of said first location information obtained and of the list of services, determining at least one first available communications service linked to at least one geographic availability zone in which the mobile terminal of the first user is located, obtaining, via the mobile network, of at least second information of the location zone of said at least one mobile terminal of the second user and of at least one second alias datum determined from a user identifier linked to the mobile terminal of the second user, as a function of said second location information obtained, and of the list of services, determining at least one second available communications service, linked to at least one geographic availability zone in which the mobile terminal of the second user is located, selection of an identical service for the mobile terminal of the first user from among the first available communication services and for at least one mobile terminal of the second user from among the second available communication services, and linking, via the platform, as a function of said first alias datum and of at least one second alias datum, of the mobile terminal of the first user and of at least one mobile terminal of a second user for which said service has been selected, via said server of the provider of the selected service.

Such a method provides users in communication with a location-based service, without disclosing the identity of a correspondent either to the provider of the service or to the other correspondent. Also, since the exact location-based data of the terminal of a user are not transmitted outside the network of the operator, no transmission authorization of these data must be requested to the user.

The user identifier linked to the mobile terminal of the first user or of the second user can be an identifier linked to a user identification module of the mobile terminal of the first user or of the second user. This ensures that the user identifier employed properly identifies the owner of the mobile terminal.

According to an advantageous and non-limiting characteristic, since said linking process of the method is implemented via an anonymous connection wireless network connecting the mobile terminals to the platform, each process of obtaining at least one item of information of the location zone of at least one mobile terminal of a user of the method can comprise an process of identifying the user comprising the following processes performed by the platform:
- determination of a temporary identification code linked to said alias datum,
- transmission to the mobile terminal via said mobile network of said temporary identification code,
- receipt via said anonymous connection wireless network of a message originating from the mobile terminal comprising said temporary identification code.

The delivery to the user of a location-based service, while not divulging the identity of the user of the mobile terminal to the provider of the service, is made possible even if the user is connected to the platform via an anonymous connection network such as an open Wifi network. In fact, the connection to the platform by such an anonymous connection network does not allow the latter to determine the alias datum relative to a user connected anonymously but following the obtaining by the platform of the alias of a user connected via the mobile network, the extra processes described hereinabove having a temporary identification code correspond to this alias, and finally set up correspondence between this temporary identification code and the same user connected via the anonymous connection network. The platform obtains the appropriate alias datum for the user connected anonymously.

According to another advantageous and non-limiting characteristic the method can comprise a transmission process to the mobile terminal of a user, following correct input of a USSD code ("Unstructured Supplementary Service Data") or a short number by the user on his mobile terminal, of a message enabling connection from the mobile terminal to the platform.

This lets a user connect simply to the platform without having to input a complex URL ("Uniform Resource Locator"). Also, with input of such a code or number needing only a keypad, such a process can be performed by any type of telephone and therefore use the method with any type of mobile terminal fitted with a keypad and a browser.

Also, obtaining information of the location zone of a terminal can be initiated following detection of connection from the mobile terminal to the platform or by receipt of a request message transmitted by the mobile terminal to obtain a list of available services from the platform. This automatically produces the information of the location zone of the terminal during its connection without requiring the latter to send a request message of available services and also lets the terminal again request a list of the available services after its initial connection.

According to advantageous and non-limiting characteristics, the platform can identify an available service selected by a user of a mobile terminal by conducting the following processes:
- transmission to the mobile terminal of a list of available services corresponding to the geographic zone where the mobile terminal is located,
- receipt of an identification message of the selected service from among the available services, originating from the mobile terminal.

This does not suggest to the user that the services to which his geographic location zone gives him access and determines simply the service preferred by the user from among the different available services.

The linking process can comprise a matching of said first and second alias data with pseudonyms serving to identify said first and second users with the server of the provider of the selected service, the matching process being performed by the platform, and the linking is done by using said pseudonyms. This lets a user use a temporary pseudonym and be identified by different pseudonyms for different services.

Also, linking can comprise the following processes performed by the platform:
- transmission to the server of the provider of the selected service of a request relative to the selected service comprising the pseudonyms linked to the mobile terminals of the first and second users,
- receipt of data relative to the provision of said service originating from the server of the provider of the selected service, at least some of the data received being personalized for those users identified by the received pseudonyms,
- transmission of data relative to the provision of said service to mobile terminals of first and second users.

This lets the platform have the mobile terminals of the first and second users communicate without divulging the identity of the users to the provider of the service. In this way the latter cannot make contact with the mobile terminals without passing through the platform, which severely limits the risks of unwanted solicitation for users.

The linking process can also comprise transmission by the platform to a server of the provider of the selected service of an alphanumeric code input by a user on his mobile terminal or else a code corresponding to an NFC beacon ("Near Field Communication"), a flashcode or an e-beacon read by the user via his mobile terminal, so that said server of the service provider delivers an associated service to the user.

This lets the user simply request a service without having to browse a list of services. Such a code can also be input on any type of mobile terminal with keypad, not excluding mobile phones other than "smartphones".

The linking process can finally comprise at least one process performed using the platform from among a transmission process to the mobile terminal of the first or of the second user of email or text message originating from the server of the provider of the selected service and/or a setup process for voice communications with the mobile terminal of the first or of the second user. This lets the user receive communication data in other formats than pages of Internet page type, these formats able to be further adapted to a communications service. Transmission of these data always being done using the platform, the identity of the users of mobile terminals is not disclosed to the service provider and this protects users from unwanted solicitations.

The method can also comprise a process for providing a user by the platform with a personal web page comprising personal information such as email address, said personal information able to be updated by the user. This lets the user have control of his personal data brought to the knowledge of the platform and be able to correct them if they prove inaccurate.

Also, the data exchange between the platform and a service provider server can be done securely via a virtual private network (VPN) set up between the platform and the server of the service provider. This reinforces the security of data exchanges between the platform and the service providers, any device external to the network of the operator trying to connect to a server of a service provider being rejected.

According to an advantageous and non-limiting characteristic, with each service also being linked to at least one item of information relative to the delivery period of said service:
- determining at least one first or second available service, linked to at least one geographic availability zone in which the mobile terminal of the first or second user is located is a function also of information relative to the delivery period of said services, and
- linking (E4), using the platform (2), of the mobile terminal (1.1) of the first user and of at least one mobile terminal of a second user is done during the delivery period of said selected service.

A communications service can be proposed only temporarily, for example on occasion of a trade fair or a conference.

Some embodiments described herein relate to a computer program product comprising code instructions for execution of a method as described herein when a processor executes this program.

Some embodiments described herein relate to a platform configured to be connected to a mobile network and link a mobile terminal of a first user and at least one mobile terminal of a second user using at least one server of a communications service provider,
said mobile terminals being configured to be connected to the mobile network,
wherein it stores a list of services, each service being linked to at least one geographic availability zone and wherein it is configured to:
- obtain, via the mobile network, first information of the location zone of the mobile terminal of the first user and a first alias datum determined from a user identifier linked to the mobile terminal of the first user,
- as a function of said first location information obtained, and of the list of services, determine at least one first available communications service, linked to at least one geographic availability zone in which the mobile terminal of the first user is located,
- obtain, via the mobile network, at least second information of the location zone of said at least one mobile terminal of the second user and at least one second alias datum determined from a user identifier linked to the mobile terminal of the second user,
  - as a function of said second location information obtained, and of the list of services, determine at least one second available communications service, linked to at least one geographic availability zone in which the mobile terminal of the second user is located,
- select an identical service for the mobile terminal of the first user from among the first available communication services and for at least one mobile terminal of the second user from among the second available communication services, and linking, using the platform, as a function of said first alias datum and of at least one second alias datum, the mobile terminal of the first user and the at least one mobile terminal of a second user for which said service has been selected, via said server of the provider of the selected communication service.

Such computer program product and platform have the same advantages as those mentioned for the method described herein.

BRIEF DESCRIPTION OF THE DRAWINGS

Other characteristics and advantages will emerge from the following description of an embodiment. This description will be given in reference to the appended drawings, in which.

DETAILED DESCRIPTION OF THE PREFERRED EMBODIMENT

Figure 1:
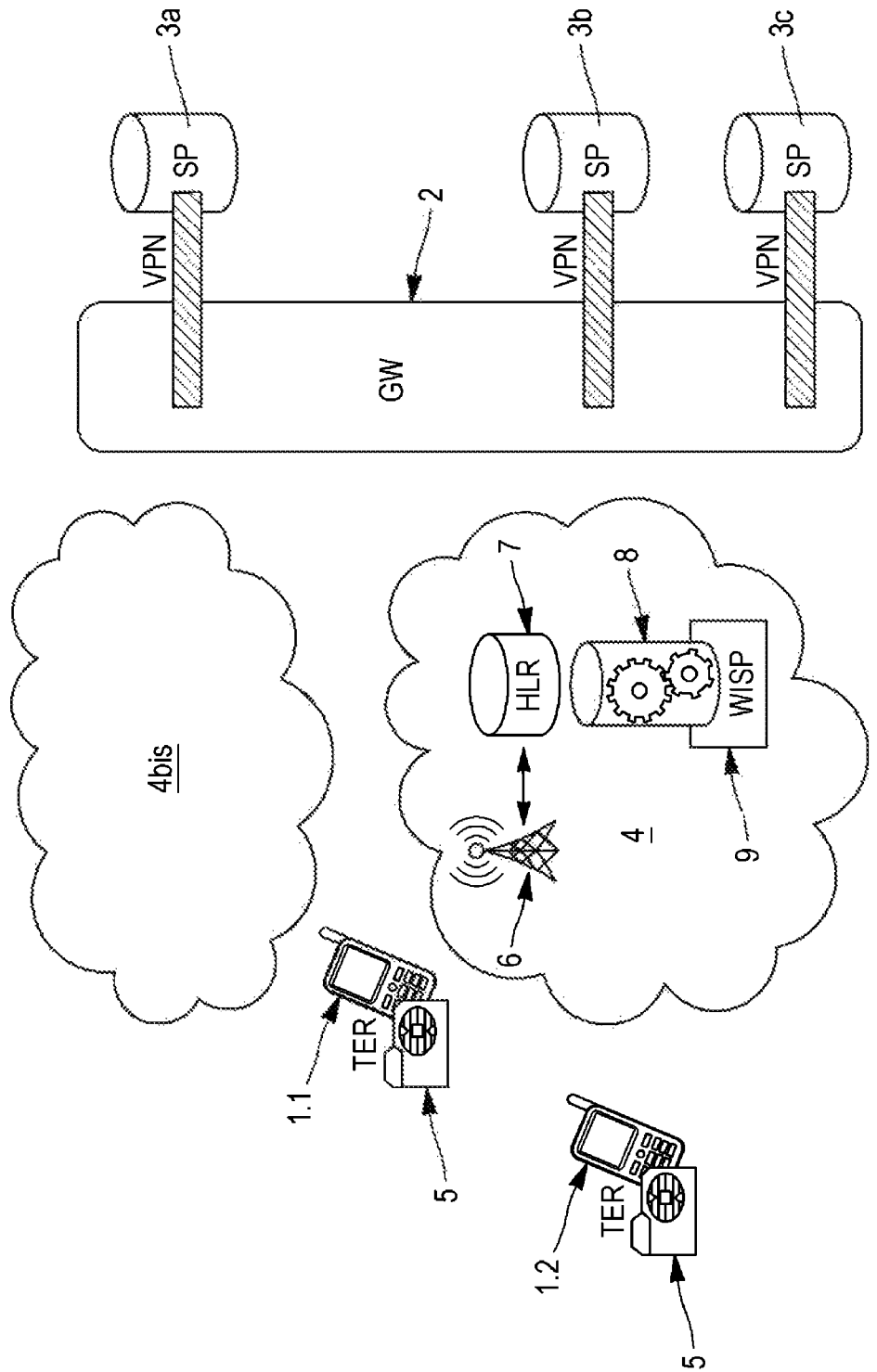
FIG. 1 schematically illustrates material components for possible execution of the methods provided herein.

In reference to FIG. 1, one embodiment relates to a method for linking a mobile terminal 1.1 of a first user and of at least one mobile terminal 1.2 of a second user using at least one server 3a, 3b, 3c . . . of a communications service provider using a platform 2 configured to be connected to a mobile network 4 managed by an operator. The mobile terminals are configured to be connected to the mobile network 4. Also, the mobile terminals can be connected to the platform via of an anonymous connection wireless network 4bis such as a Wifi network. Each mobile terminal comprises a secure element 5. Such a secure element 5 can store secure data in a memory, and can comprise for example a smart card comprising a microprocessor connected by a data bus to a RAM and to a rewritable non-volatile memory such as a flash memory or an EEPROM memory and securely storing in its non-volatile memory data and applications executable by said microprocessor. The secure element is typically a SIM card ("Subscriber Identity Module"), in this document called "user identity module" . . . .

When connecting to the mobile network, each mobile terminal is identified by the mobile network via of at least one user identifier.

This user identifier is an identifier linked to the secure element 5, for example the subscriber identifier (IMSI number, "International Mobile Subscriber Identity") and/or the call number (number MSISDN, "Mobile Station Integrated Service Digital Network Number"). Such a user identifier is unique and also serves to identify the user identification module. In this respect, the notion of user identifier is represented variously in this document:
- a user, as physical person, subscriber to a client account with a mobile network operator (whether a client account with or without subscription, with or without prepaid account, etc. . . . ) and,
- a user, as mobile terminal, connected to the mobile network, identified and distinguished from the other mobile terminals connected via the user identification module housed in this terminal.

The user, physical person, having taken out a client account with a mobile network operator is recognized using such a user identifier as user a priori of the mobile terminal via the user identification module housed in the mobile terminal being used, irrespective of the physical person effectively using this mobile terminal and irrespective of the mobile terminal in which the user identification module is housed.

The method described hereinbelow is executed by the platform 2 and enables secure delivery by a server of a service provider 3a, 3b, 3c to the mobile terminals 1.1, 1.2 of a location-based communications service. For this, the platform 2 is placed as an intermediary between the mobile terminals and the servers 3a, 3b, 3c to mask the real identity of the mobile terminal users, as physical persons. Each user is identified with servers 3a, 3b, 3c by a pseudonym only. This pseudonym can be temporary and the correspondence between the latter and said alias of the user is known to the platform 2 only. In variant embodiments this' pseudonym can be permanent and identical to the alias or can be a function of the alias. Also, correspondence between this alias/this pseudonym and the real identity of the user of a mobile terminal remains unknown to servers 3a, 3b, 3c which never communicate directly with the mobile terminal. Also the alias/pseudonyms cannot be exploited in another context or by another entity of the network. The use of such a pseudonym for identification of the user of a mobile terminal by the servers of the service provider also prevents the user of the mobile terminal from having to input an identifier and a password to be identified with servers.

The mobile terminal 1 of a user can consist of a mobile phone, a "smartphone", a tablet, a games console, a laptop, a PDA "Personal Digital Assistant") or any other mobile terminal fitted with such a secure element 5 and wireless communication features letting it access the mobile network 4. The mobile terminal 1 can be a mobile phone of any type, fitted or not with a large screen, a GPS chip, tactile input features. The mobile terminal includes at least one software application such as a browser capable of displaying a page of web site type such as a HTML or PHP page or more generally setting up a communications link with a remote server. In this way such a mobile terminal is not necessarily a "smartphone".

The mobile network 4 can comprise a mobile phone network of GSM, GPRS, UMTS, LTE type. Communications over this network can be secure, especially by encryption of exchanged data. 13y way of example the mobile phone network shown in FIG. 1 is a mobile network of GSM type comprising at least one base station (BTS) 6 connected to the mobile terminals and at least one geographic subscriber location register (HLR or Home Location Register) 7. The HLR consists of a central database of the mobile network operator, comprising information relative to any user authorized to use this network and especially his location in the network. The HLR comprises especially the following information characterizing the user himself: the IMSI ("International Mobile Subscriber Identity"), a unique identifier of the user also inscribed on the SIM card, the IMEI ("International Mobile Equipment Identity") defining the Mobile Station used, or generally the mobile phone of the user, the MSISDN indicating the international call number via which the user can be reached.

The mobile network also comprises a processing module 8 for generating an alias datum from at least one user identifier linked to the secure element 5 such as the IMSI and/or MSDISDN supplied by the HLR 7. Such a processing module 8 can be included in a WISP 9 ("Wireless Internet Service Provider") or be connected to a WISP 9. The processing module 8 and the WISP will be combined hereinbelow. This alias datum can result from any transformation of this user identifier or these user identifiers, for example transformation by application of a hashing function. The transformation function is selected such that the alias datum obtained by transformation is unique and permanent, enabling not equivocated identification by the platform 2 of the physical person subscriber of the client account and also of the mobile terminal of the user. Each alias datum can match, via the platform 2, with a pseudonym used as unique identifier of the user of the mobile terminal corresponding with servers 3a, 3b, 3c of the service providers.

The alias datum of a user can be generated at the time of production and/or configuration of the user identification module, or even during initial connection to the mobile network of the operator of a mobile terminal integrating this user identification module. The generated alias datum is stored in association with a user identifier in a database specific to the operator. The alias datum is permanent and does not change during the following connections to the mobile network. The alias datum serves of anonymous identifier to the mobile terminal and/or to the user of this mobile terminal and/or to the subscriber identification module of this terminal.

The platform 2 is designed to obtain this alias datum, following connection of the mobile terminal to the platform via the mobile network or the anonymous connection network and to transmit a pseudonym corresponding to this alias datum to one at least of the servers 3a, 3b, 3c of the communications service providers. An embodiment using the HTTP protocol (Hypertext Transfer Protocol) is described hereinbelow and illustrated in reference to FIGS. 2 and 5.

A mobile terminal sets up a Web connection for connection of the mobile terminal to the platform. For example, a first HTTP request is sent by the terminal containing the URL ("Uniform Resource Locator") corresponding to the platform: http://urlp/, where 'urlp' is the Web domain managed by the platform.

In a first embodiment, exchanges between the mobile terminal and the platform pass via the mobile network. This first HTTP request is received by the WISP. The received URL is enriched by the WISP by inserting the alias datum ('aa') and location zone information 'xy'. The enriched URL is for example in the form http://urlp/aa/xy/. The platform then receives the first HTTP request containing the enriched URL, and extracts from this the alias and the location zone information. The platform has no knowledge of the user identifier(s) used for generation of the alias datum.

In a second embodiment, the mobile terminal is connected to the platform via an anonymous connection network Obis such as a Wifi network used for most communications between the mobile terminal and the platform. The alias datum is not included in the messages transmitted by the mobile terminal to the platform and the latter initially knows the mobile terminal only via a non-personal datum such as its IP connection address. The mobile terminal must first identify with the platform so that the latter links the appropriate alias datum to it. For this the mobile terminal can first of all transmit a connection request message to the platform via the mobile network. As described hereinabove, this message is transmitted to the platform with the alias datum and the location zone information of the mobile terminal of the user inserted by the WISP. In response to receipt of such a message, the platform can generate a temporary identification code corresponding to this alias and transmit the latter to the mobile terminal via the mobile network. At this stage the platform is unaware that the mobile terminal to which it has just transmitted this temporary identification code via the mobile network is the same as that connected via the anonymous connection network. The mobile terminal can finally be identified with the platform via the anonymous connection network by retransmitting it the temporary identification code. On receipt of this temporary identification code via the anonymous connection network, the platform can identify the mobile terminal having transmitted it this code as identical to the mobile terminal to which it has previously transmitted this code via the mobile network and whereof it knows the alias datum. The platform can match this alias datum with a datum identifying the mobile terminal connected via the anonymous connection network, for example its IP address.

The platform thus obtains the alias datum appropriate to the user connected anonymously to the platform via the anonymous connection network and the location zone information of this user.

Next, as a function of the location zone information of the mobile terminal and optionally information relative to the delivery period of said services, the platform will either send to the mobile terminal a list of available servers (if there is more than one server linked to the location zone) by sending back a list of possible URLs corresponding to the different servers, or directly route the first HTTP request to the single server available. When the platform directly routes the first HTTP request to the single server available, it adds the Web domain 'url3a' managed by the server available, deletes the location zone information of the URL, and replaces the alias datum aa by the pseudonym ps: http://urlp/url3a/ps/. When the platform sends a list of URLs back to the terminal, these URLs are in the form http://urlp/url3a
http://urlp/url3b
http://urlp/url3c where url3a, url3b, url3c are the Web domains managed by the servers 3a, 3b, 3c respectively. A second HTTP request is sent by the mobile terminal to the platform using one of these URLs.

In the first embodiment, the WISP again intercepts this HTTP request and inserts therein the alias datum 'aa' and location zone information 'xy': http://urlp/url3a/aa/xy for example. Then the platform routes the second HTTP request to the relevant server, after replacement of the alias datum by the pseudonym and possible deletion of the location zone information of the URL: http://urlp/url3a/ps/.

In the second embodiment, it is the platform which determines the alias datum linked to the connected mobile terminal, for example by way of correspondence with its IP address. Then the platform routes the second HTTP request to the relevant server, after insertion of the pseudonym linked to this alias datum and possible deletion of the location zone information of the URL: http://urlp/url3a/ps/.

The enrichment mechanism of the HTTP request just described will be used for all requests emitted by the mobile terminal to the platform.

The mechanisms described hereinabove are applied to any mobile terminal connecting to the platform, in particular to the mobile terminal of the first user and to at least one mobile terminal of a second user to be linked via of a communications service.

The servers of the service providers 3a, 3b, 3c comprise a RAM and storage components such as a rewritable non-volatile memory (flash memory or EEPROM memory) which can store a database and processing components comprising a processor. Said servers can also comprise interface features letting them connect to the platform 2, of wired type such as an Ethernet link, or wireless such as a Wifi or Bluetooth connection. Such servers can also be connected using a USB, Ethernet, Firewire, eSata connection, etc. to an external storage device such as an external hard drive or a network attached storage ("NAS"). Such a server is dedicated to provide a communications service to at least two users, for example via a mobile site intended to be displayed by the browser of the mobile terminals of users or a mobile application intended to be executed by the terminals. Such an online service can be supplied by the service provider for the account of the organizer of an event such as an exhibition center. Such a service can be delivered only during a predetermined delivery period, for example the duration of the exhibition.

The platform 2 can comprise a proxy server, storage components such as a rewritable non-volatile memory (flash memory or EEPROM memory) which can store a database and processing components comprising a processor. Said platform 2 can also comprise interface features, of wired type such as an Ethernet link, or wireless such as a Wifi or Bluetooth connection letting it connect both to said mobile network and/or the anonymous connection network and also the servers 3a, 3b, 3c . . . of the service providers.

Virtual private networks (VPN) can be set up between the platform 2 and each server 3a, 3b, 3c . . . of a service provider. Such virtual private networks can be seen as an extension of local networks and preserve the logical security which can prevail inside a local network.

Figure 2:
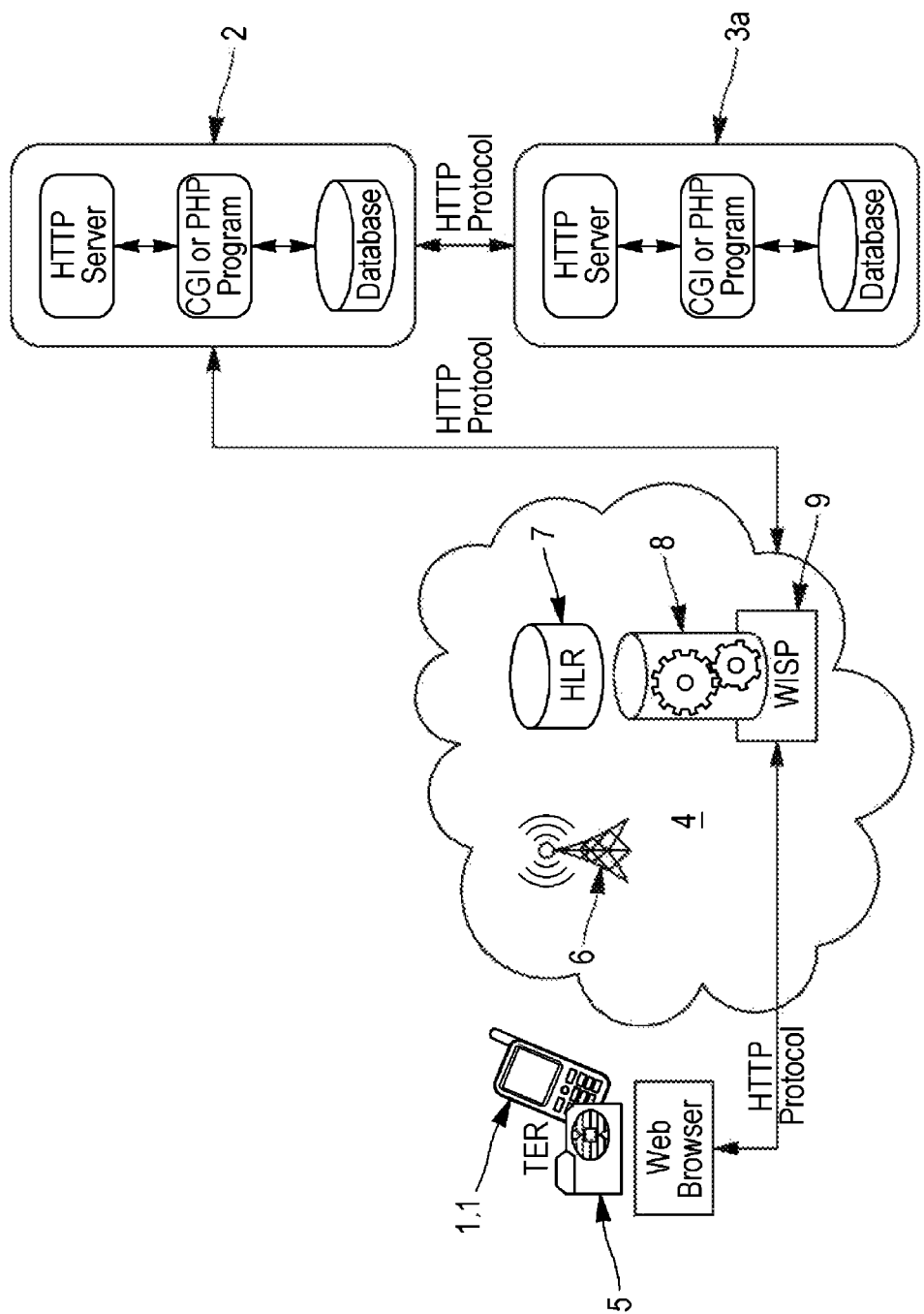
FIG. 2 schematically illustrates material components for possible execution of the embodiments herein in which the communications use HTTP protocol.

According to an exemplary embodiment, communications between the mobile terminals 1.1, 1.2, the mobile network 4, the platform 2 and the servers of the service providers 3a, 3b, 3c use http protocol. The material components corresponding to such an exemplary embodiment are shown in FIG. 2.

To let a user access a location-based communications service delivered by a service provider while securing exchanges, the method for secure exchanges can be implemented in several phases: registration of the servers of the service providers with the platform, connection of the mobile terminals to the platform, obtaining information relative to the mobile terminals, accessibility of the users to the available services and delivery to the mobile terminals of a communications service provided by a service provider.

Registration of the Servers with the Platform

Figure 3:
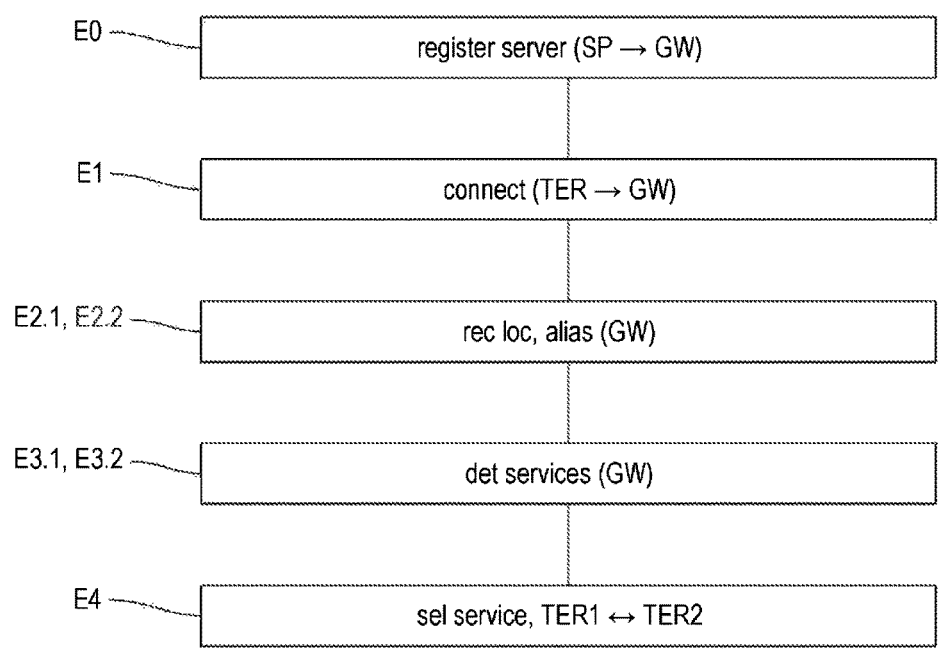
FIG. 3 is a diagram showing an example of execution of a linking method according to an exemplary embodiment.

During a preparatory process E0, in reference to FIG. 3, each service provider registers its server 3a, 3b, 3c on the platform 2 so that the location-based services it proposes can be delivered by the latter to the mobile terminals, optionally during a predetermined delivery service period. For this, each service provider indicates a physical address characterizing the geographic location of its physical setup near which it wants to provide a location-based service, and optionally information relative to the delivery period of the service. Such information relative to the delivery period of the service can comprise a start date and a finish date of availability of the service.

In a non-limiting embodiment, the physical address can correspond to the geographic center of a service activity without the service provider necessarily having physical setup at said address, for example in the case of a street festival. The same service provider can register several geographically remote physical setups or several geographically remote service activities. The service provider can also provide information such as maximum distance of provision of a service relative to the geographic location indicated, letting the platform 2 determine a geographic availability zone in which said service can be provided to a user of a mobile terminal. In the absence of provision of such information, a geographic zone corresponding to a disc centered on the geographic location indicated and having as its radius a value by default can be used. Such a geographic zone cannot exceed the territory covered by the operator of the mobile network 4.

On completion of this preparatory process E0, the platform 2 has a list of services for which service providers have registered a server, each service being linked to at least one geographic availability zone and optionally to one delivery period of the service. These data can be stored in the form of a database registered in the storage components of the platform or in a remote database accessible via the platform. In this way, each service provider can delimit the geographic zone(s) in which it authorizes the user of a mobile terminal to receive a service. The service provider can propose a service adapted to this geographic location, optionally limited in time. A geographic zone can correspond to one or more location cells managed by the operator of the mobile network. The extent of the geographic zone is variable and a function of the maximum range of the BTS of the cell(s) corresponding to the defined geographic zone.

Connection of the Mobile Terminal to the Platform

During a first process E1, at least one user of a mobile terminal requests connection of the latter to the platform 2.

According to a first variant, to do this the user inputs via the browser of his mobile terminal a network address such as an IP address or an http address letting him connect to the platform 2. This address can then be added to favorites.

According to a second variant illustrated in FIGS. 4a to 4d, a unique code USSD ("Unstructured Supplementary Service Data") 10, for example, #100#, or else a short number such as "555" can have been defined to facilitate connection of the mobile terminal to the platform 2. The user can input the USSD code or dial this short number on the keypad of his mobile terminal and receive in response a message letting him connect to the platform such as a SMS message 11 in the body of which is the address of the platform 2. Such an SMS can be replaced by any type of message processed by the operator of the mobile network 4, for example an MMS. The input address is sent to the WISP 9 of the operator network.

The WISP 9 authorizes access of mobile terminals recognized on the mobile network 4 only, i.e., for which a user identifier can be obtained, for example by querying the user identification module 5. Any attempt at connection by a terminal not having a user identification module, or trying to connect from other networks such as the Internet is refused by the WISP.

Obtaining Information Relative to the Mobile Terminal by the Platform

During a second process E2.1, respectively E2.2, the WISP 9 transmits the connection request from the mobile terminal of the first user 1.1, respectively of at least one second user 1.2 to the platform 2, matching location information of the mobile terminal 1.1, 1.2 of the first user, respectively of at least one second user and of the first alias datum identifying the first user, respectively of at least one second alias datum identifying at least one second user. The WISP 9 can obtain this information by querying equipment of the mobile network of the operator such as the HLR 7 and the processing module 8. During such query, the WISP can supply an identifier of a mobile terminal: for example a user identifier contained in the user identification module of the mobile terminal requiring connection to the platform 2. The platform has no need to query the mobile terminal to obtain location information of the mobile terminal.

Figure 5:
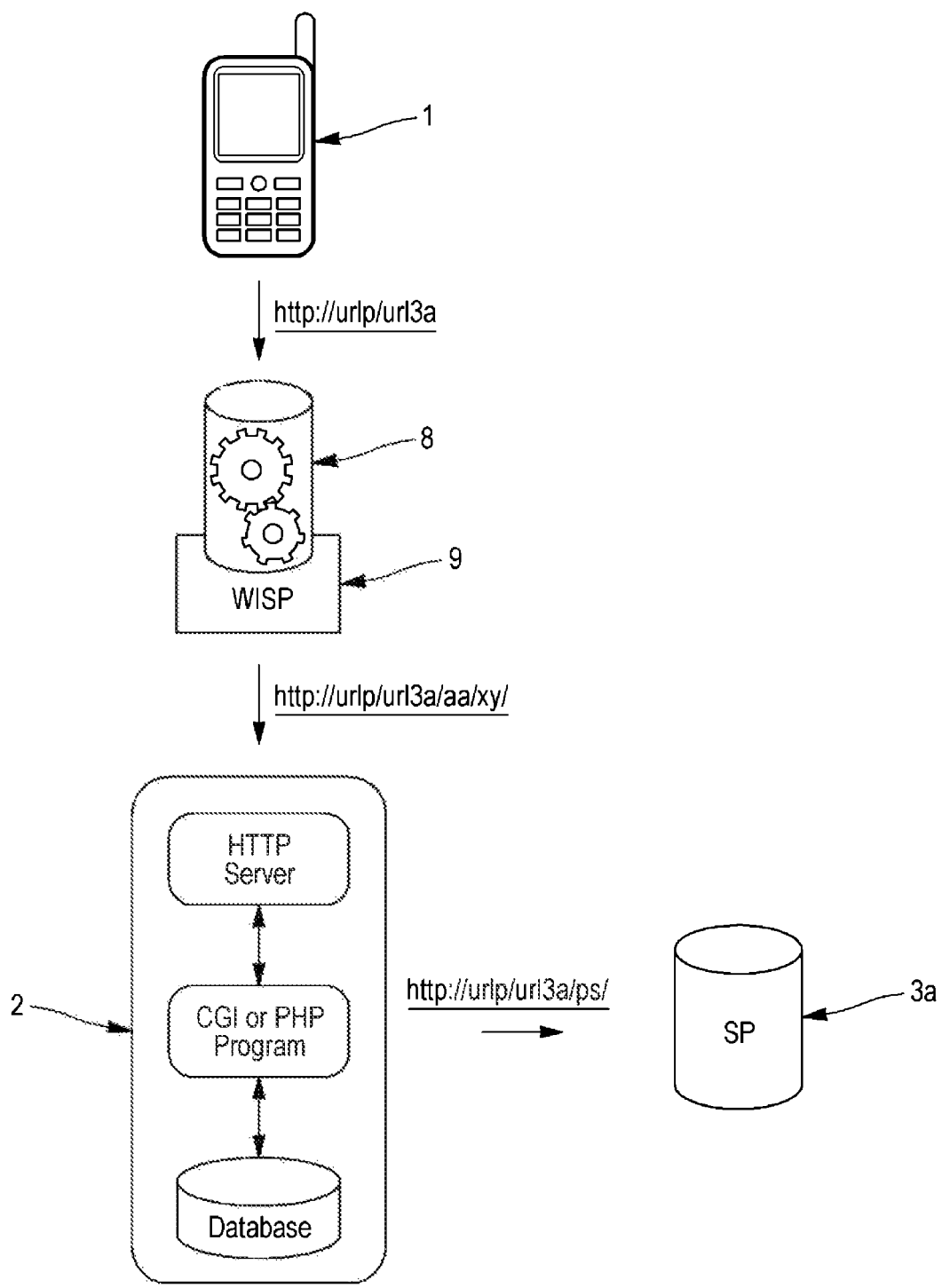
FIG. 5 illustrates an example of transmission of the alias and geographic coordinates from the mobile terminal to the platform then of a pseudonym to the server of the selected service provider.

The WISP 9 can also transmit to the platform 2 the identifier of the operator of the mobile network 4. This information can be transmitted to the platform 2 by the WISP (Wireless Internet Service Provider) of the mobile network 4 in the form of an url such as a http link, as shown in FIG. 5. No location-based data transmission agreement on the part of the first or second users of the mobile terminals 1.1, 1.2 is required since the platform 2 forms part of the equipment of the operator.

According to a first variant, this second process is initiated following the connection request of a mobile terminal to the platform 2 during first process E1.

According to a second variant, this second process can be initiated later by sending a request message for obtaining a list of available services via a mobile terminal 1.1, 1.2 to the platform 2. Such a message can for example be sent by the mobile terminal after receipt of a first service so as to determine what the other available services are. Initial connection of the mobile terminal to the platform 2 has already taken place from a certain time.

The platform obtains first, respectively second, information of the location zone of the mobile terminal of the first, respectively at least one second user and the first, respectively at least one second alias datum determined from a user identifier linked to the mobile terminal of the first, respectively at least one second user.

In the first embodiment, in which exchanges of messages between a mobile terminal and the platform all pass via the mobile network, the platform has no additional operation to carry out to link each alias datum received and the user of corresponding mobile terminal to which a service will be delivered via the mobile network.

In the second embodiment in which the majority of messages between the platform and a mobile terminal is intended to pass via an anonymous connection network, for example a Wifi network, the mobile terminal must be identified with the platform via the anonymous connection network so that the latter makes the link between this anonymous connection and the alias datum received. The second process E2.1, E2.2 can comprise the following additional processes:

a process for determination by the platform of a temporary identification code linked to the alias datum, a first transmission process by the platform to the mobile terminal via said mobile network of said temporary identification code, a second transmission process by the mobile terminal to the platform of the identification code via the anonymous connection network, a process for receipt by the platform via said anonymous connection wireless network of a message originating from the mobile terminal comprising said temporary identification code.

The platform can have an alias datum appropriate to the user connected anonymously to the platform correspond via the anonymous connection network.

Accessibility of the User to Available Services

During a third process E3.1, respectively E3.2, the platform 2 determines, as a function of said first, respectively second location information obtained during the second process E2.1, E2.2, of the list of services stored on completion of process E0 and optionally information relative to the delivery period of said services, the first, respectively second available communication services, linked to at least one geographic availability zone in which the mobile terminal of the first, respectively of the at least one second user, is located. These available services are those to which the geographic location of the mobile terminals 1.1, 1.2 will give the right to access.

If the platform 2 identifies that no service is available for a user, it returns to its mobile terminal a page indicating that no service is available in the geographic zone in which the user is located.

Delivery of a Service

During a fourth process E4 the first user and at least one second user are put in communication via a communications service. For this, an identical communications service must be selected for these users.

If the platform 2 determines that a single service is available for a user, this service can be automatically selected by the platform 2 as the selected service which the user will access during the following process.

Figure 4A:
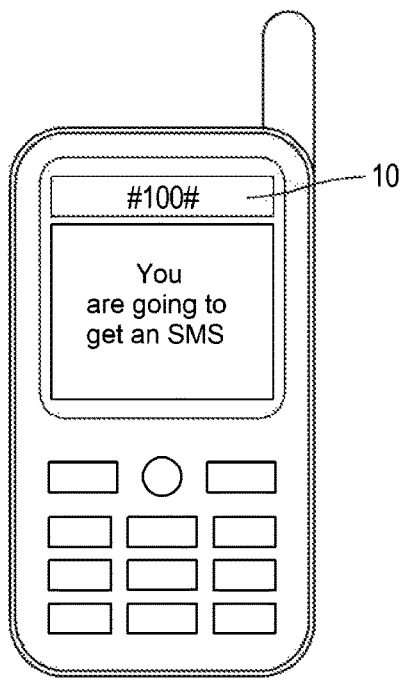
FIGS. 4a, 4b, 4c, 4d illustrate an example of access by a user of a mobile terminal to an available service with input of a USSD code or a short number according to an exemplary embodiment.
Figure 4B:
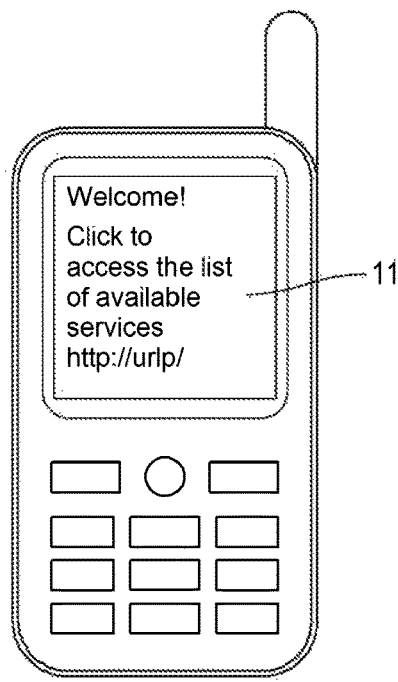
Figure 4C:
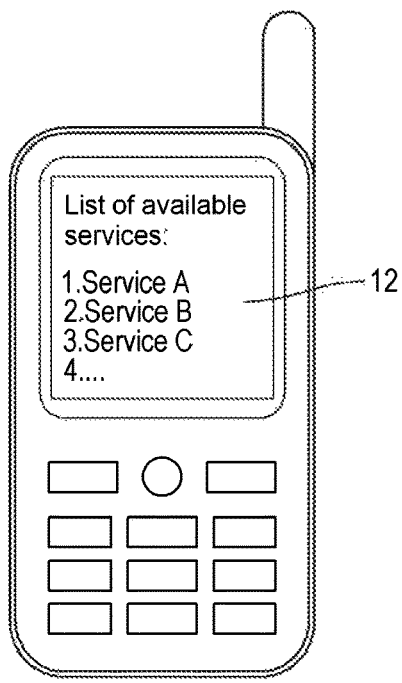

If the platform 2 determines that at least two services are available for a user, the latter transmits to his mobile terminal a page comprising a list of available services 12 in the geographic zone of the user. This list is advantageously classified by increasing order of distance between the geographic location zone of the mobile terminal and the geographic location of the physical setup linked to the service, as illustrated in FIG. 4c.

According to a variant, the platform 2 also returns a page comprising a list when it determines that a single service is available for the user. To send messages to a mobile terminal, such as for example pages comprising lists of available services, the platform can send these messages to the WISP accompanied by the alias datum used to identify the recipient of the message, or else transmit these messages directly to the mobile terminal via the anonymous connection network. When several services are accessible, a service is selected in the transmitted list.

In a first variant, a user himself selects a service in the list displayed on his mobile terminal.

In the first embodiment, a message identifies the selected service from among the available services and is transmitted from the mobile terminal to the WISP. The WISP retransmits this message to the platform after having added the information of the location zone of the mobile terminal and the alias datum identifying the user of the mobile terminal. This information can be transmitted by the WISP to the platform in the form of an URL such as an http address.

In the second embodiment, in the case of connection to the platform via an anonymous connection network, it is the platform which determines the alias datum linked to the connected mobile terminal.

In a second variant, a service selection rule is applied so as to make an automatic selection of a service. The selection rule is for example based on criteria such as: proximity between the geographic location of the connection zone of the mobile terminal and that linked to the service, order of preference defined between the services, novelty of the service, type of service (cinema, restaurant, supermarket, etc. . . . ) or other. In this variant, it is the platform 2 which identifies at least one service selected from among the available services determined by applying a selection rule. Confirmation can be requested to the user.

To have two users communicate, an identical service is selected for the mobile terminal of the first user from among the first available communication services and for at least one mobile terminal of the second user from among the second available communication services.

Following this selection of a communications service, as a function of said first alias datum and of at least one second alias datum, the platform 2 links the mobile terminal of the first user and at least one mobile terminal of a second user via the server of the provider of the selected communication service 3a, 3b, 3c so that the selected communication service is delivered to users.

When each service is linked to at least one item of information relative to the delivery period of said service, and when determination of the first and second available services has been made as a function of this delivery period information, linking of the mobile terminals can be done during the delivery period of the selected service.

Optionally, during the fourth process E4, the platform can match the first and second alias data with pseudonyms serving to identify the first and second users with the server of the selected service provider. In contrast to the alias data which are permanent these pseudonyms can be temporary and be valid only during the delivery period of said service. A pseudonym can be automatically attributed, to the user of a mobile terminal and modifiable thereafter.

To link the mobile terminals, the platform 2 transmits a service request to the server of the provider of the selected communication service 3a, 3b, 3c. This request can comprise the pseudonyms of the mobile terminals of the first and second users needing the service. These pseudonyms could be used by the service provider to identify users during various exchanges of data relative to a service or during successive instances of access to a service without the service provider having to know the real identity of the users. The service provider especially does not know the user identifier or the MSISDN number of the mobile terminals and has no way to directly contacting the mobile terminals, allowing users to not be solicited unwantedly by such service providers. Such a service request can be transmitted by the platform in the form of an url such as an http address comprising the pseudonyms. Data relative to the provision of the selected service are then sent by the server of the service provider 3a, 3b, 3c to the platform 2. At least some of the data sent can be personalized for those users identified by the pseudonyms received.

In the first embodiment, the platform 2 replaces each pseudonym by the associated alias datum and retransmits these data to the WISP of the network of the operator who, knowing the correspondence between the alias datum of a mobile terminal and his user identifier, transmits each mobile-terminal data relative to the provision of the service so that his user can access the selected communication service.

In the second embodiment, the platform retransmits these data directly to the mobile terminals via the mobile network.

In the first embodiment, the commands which can be input by a mobile terminal in terms of access to the service, such as the fact of clicking on a link or a button in a page sent by the service provider, are sent by the mobile terminal to the WISP which transmits them on to the platform by replacing any identity information of the mobile terminal by the alias datum generated by the processing module 8 for the mobile terminal.

In the second embodiment, in the case of connection to the platform via an anonymous connection network, these commands are transmitted directly via the mobile terminal to the platform via the anonymous connection network and it is the platform which determines the alias datum linked to the connected mobile terminal.

In the two embodiments the platform then retransmits these matching commands of the pseudonym to the server of the service provider.

Figure 4D:
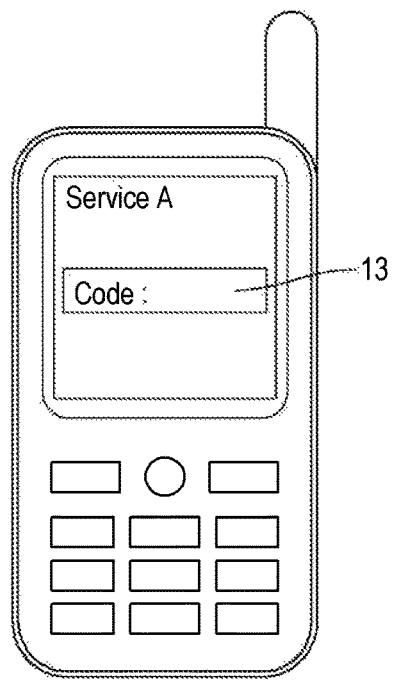

As illustrated in FIG. 4d, the user of a mobile terminal can input an alphanumeric code on his mobile terminal, for example in an input field 13 of a page sent by a server of the service provider 3a, 3b, 3c, or else read an NFC beacon, a flashcode or an e-beacon with his mobile terminal to request delivery by this server of an associated service once the input code or the code corresponding to an NFC beacon, the flashcode or the e-beacon is retransmitted by the platform to the server of the service provider 3a, 3b, 3c.

Filtering of available services performed by the platform as a function of the geographic location of a mobile terminal and optionally of information relative to the delivery period of said services during the third process E3.1, E3.2 and anonymization of data communicated to the service provider by way of the use of alias data or pseudonyms during the fourth process E4 enable the service provider to deliver a location-based communications service to users of the mobile terminals, optionally limited in time and guaranteeing confidentiality of the identity of users and their geographic location since these data are never transmitted to the service provider. Also, because data of the location zone of the mobile terminals are never transmitted outside the equipment of the operator, no transmission authorization of these data must be requested to users.

Direct Access to a Server

A user wanting to access a service the existence of which he already knows and whereof the mobile terminal is already connected to the platform 2, can use his mobile terminal 1 to send a request for provision of said service to the platform 2.

In the first embodiment, the WISP adds to this request location information of the mobile terminal and an alias datum identifying the user of the mobile terminal before retransmitting this request to the platform, as during the third process E3.1, E3.2.

In the second embodiment, in the case of connection to the platform via an anonymous connection network, it is the platform which determines the alias datum linked to the connected mobile terminal. The platform can also deduce the geographic location of the mobile terminal as a function of the zone covered by the point of access of the anonymous connection network to which the terminal is connected.

During receipt of such a request the platform 2 determines whether the geographic location of the mobile terminal gives it the right to access the requested service, i.e., if its geographic location zone is in a geographic availability zone of the requested service and optionally if the service is available as a function of the information relative to the duration of the requested service. If this is the case, the fourth process E4 is performed to provide the requested service to the mobile terminal. If not, access to the service is refused to the mobile terminal and the platform 2 sends it a page indicating this refusal of access and proposing a list of available services for its geographic location zone.

Rerouting of Services

The data sent by the service provider to the platform 2 for a mobile terminal can consist of pages of web site type intended to be displayed by the browser of the mobile terminal. The platform 2 can also transmit the mobile terminals data on communications service other than pages of Internet page type.

In the first embodiment, the platform can transmit such service data accompanied by an alias datum identifying their recipient to the WISP which, by way of its knowledge of the correspondence between the alias datum and the user identifier of the mobile terminal can transmit such data to the mobile terminal for the account of a server of a service provider 3a, 3b, 3c.

In the second embodiment the platform can transmit such service data directly to the mobile terminal via the anonymous connection network.

The mobile terminal can transmit messages of SMS or MMS type, or instant message. By way of example, exchanges of such data between a server of a service provider, the platform and the WISP can be done via FTP protocol or SNPP protocol for example.

According to a variant, the platform 2 can transfer a request for sending an electronic message such as an email for the account of a service provider 3a, 3b, 3c.

In the first embodiment, this request can be sent accompanied by the alias datum to the WISP which will take responsibility for transmitting the electronic message to the recipient due to its knowledge of the correspondence between the alias datum and the user identifier of the mobile terminal.

In the second embodiment, in the case of connection to the platform via an anonymous connection network, the platform can transmit this email directly to the mobile terminal via the anonymous connection network.

According to another variant, the platform 2 can also set up voice communication between the mobile terminals of the first and second users following a request for voice linking emitted by a server of a service provider. If the alias data of the at least two users belong to a single operator, the platform transmits the request for voice linking accompanied by alias data to the sole relevant operator which take responsibility for setting up voice communication between callers and call recipients.

If the alias data belong to two different operators, the platform transmits the request for voice linking of the at least one call recipient accompanied by his alias to the relevant operator, and in return the latter sends a temporary call number back to the platform. The platform transmits the alias of the at least one caller and the temporary call number to the second operator who takes responsibility for setting up voice communication between the callers and call recipients. Alternatively, the platform can transmit the callers and call recipients the number of a telephone conference server intended to be called by the participants to set up communication.

If one or more of the mobile terminals is connected to the platform via the anonymous connection network, the platform can transfer a call request to a mobile terminal in the form of a voice-over-IP call ("VOIP").

So that the user of a mobile terminal receives no messages or unsolicited calls on a large scale, the platform 2 can provide the user with a personal administration web site to which the user can connect from his mobile terminal to verify personal information such as his e-mail address (email), and to correct this information if necessary. Optionally, the user can also specify on this page whether he accepts getting messages from service providers by SMS, email, or voice communication and can also specify a maximum number of messages he accepts getting by these means over a given period, for example a week or a month. Such a web site is accessible from the mobile terminal by connecting to the address of the public site of the platform. During initial connection of a mobile terminal to this page, the platform creates a personal administration space linked to the alias datum of the mobile terminal. During all subsequent connections, the platform will give access automatically to the user of the mobile terminal to this personal space without the user having to provide an identifier or a password.

As a variant, such a page is a web site accessible from any device connected to the Internet network. So that he can identify the personal space which he wants to access, the user can identify with the platform via an identification method based on temporary identification code similar to that described during the second process E2.1, E2.2 hereinabove, From his mobile terminal the user can send an SMS containing a keyword particular to a predefined number. During sending of this SMS to the platform, the operator replaces the number of the issuer by the alias of the mobile terminal. On receipt of the SMS, the platform transmits a temporary identification code to the mobile terminal identified by its alias. This code can be delivered to the mobile terminal in the form of an SMS according to the method described hereinabove. Input by the user of the identification code on the web site of the platform lets him be identified with the platform and access the administration space linked to his mobile terminal.

Movements of the Terminal During Access to a Service

The geographic location of the zone of a mobile terminal is determined once after the connection request of the mobile terminal to the platform 2, then during selection of a service from among the available services. If the mobile terminal exits the geographic zone linked to a set of services while data relative to one of these services are in the process of being delivered to it by a server of the provider of the service, transmission of these data to the mobile terminal will be interrupted.

In the event where the mobile terminal has moved from when it was connected to the platform and the mobile terminal entered a new geographic zone giving it access to one or more other services, a request for refreshing of the list of accessible services can be initiated from the mobile terminal, for example, on request of the user of this mobile terminal or automatically by the platform which notices that a request has been emitted by the mobile terminal located outside the located zone of the service provider. In both cases an updated list of accessible services, a function of the new location of the mobile terminal, will be transmitted to the mobile terminal to be displayed on the mobile terminal.

Applications

The method can be used to provide a user with an anonymous communications service with other users. Neither the server provider of the service nor the other users will have knowledge of the user identifier or of the alias datum linked to this user. Instead, they will have knowledge of the identity of this user only via the alias datum linked to this user or the pseudonym selected by the platform and freely replaceable. As described hereinabove, such a service can let its users communicate via exchanges of messages text or in the form of voice communications. Also, the method can be used for linking only users located in a given geographic zone and optionally over a particular time period. Such a method is particularly adapted and restricted in time and space for anonymously linking visitors to a given place such as a museum, or participants in a given event such as a congress, a festival, a trade fair . . . . The proposed method enables anonymously linking only those participants physically present in a precise place and optionally only during the duration of a particular event.

By way of example, the method can be employed to anonymously link participants at a conference to let them raise questions and optionally provide responses. For this, each participant can connect prior to the start of the conference to the platform via his mobile terminal. Then when a user wants to ask a question to the assembly, he can transmit his question to the platform which receives this question by mediation of the operator of the mobile terminal of the requesting user, accompanied by the alias of this user. The platform can replace this alias by the pseudonym of the requesting user and transmit the question of the user accompanied by this pseudonym to all mobile terminals of other users connected for this conference. Each participant in the conference can communicate interventions of other participants, securely and anonymous, each participant being identified by the other participants by his pseudonym only. During the conference the method also lets participants connected and represented by their pseudonym have voice communication via a conference phone number initiated by the platform on request of the server. The participants could also exchange SMS/MMS anonymously.

In terms of a trade fair, the method can be employed to propose available mobile communication services to a visitor corresponding to the communication services delivered by the trade fair and its exhibitors throughout said trade fair. These communication services can comprise linking with a concierge or even a concierge of the trade fair and/or one or more spaces of the trade fair especially such as restaurants, letting the visitor ask for one or more indications such as different timetables of events held at the trade fair and the possibility of registering for these, the list of restaurants and their menus and the possibility of making reservations, the layout of the trade fair, the list of exhibitors with a link to the mobile site of the exhibitor etc. If an exhibitor interests the user of the mobile terminal, the latter can be connected to the exhibitor and/or one of the various managers on the stand, especially to find out the agenda of the day etc. via the platform. For example, on request of the user, stand officials can also be contacted by setting up voice communication or via SMS via the platform. The visitor can now contact the preferred stand manager without having to provide his mobile terminal number and without knowing the call number of the person he is contacting. Also, visitors to this trade fair could also engage with each other for an anonymous telephone conversation, for a telephone conference between several pseudonyms or even to communicate anonymously via SMS/MMS.

What is claimed is:

1. A method for linking a mobile terminal of a first user and at least one mobile terminal of a second user via at least one server of a communications service provider via a platform configured to be connected to a mobile network,
   said mobile terminals being configured to be connected to the mobile network,
   the method comprises the following processes performed by the platform having a list of at least one service, each service being linked to at least one geographic availability zone:
   obtaining, via the mobile network, first information of the location zone of the mobile terminal of the first user and a first alias datum determined from a user identifier linked to the mobile terminal of the first user;
   as a function of said first location information obtained, and of the list of services, determining at least one first geographically available communications service, linked to at least one geographic availability zone in which the mobile terminal of the first user is located;
   obtaining, via the mobile network, at least second information of the location zone of said at least one mobile terminal of the second user and of at least one second alias datum determined from a user identifier linked to the mobile terminal of the second user;

as a function of said obtained second location information, and of the list of services, determining at least one second geographically available communications service, linked to at least one geographic availability zone in which the mobile terminal of the second user is located; and selecting an identical geographically available service for the mobile terminal of the first user from among the first geographically available communication services and for at least one mobile terminal of the second user from among the second geographically available communication services, and linking, via the platform, as a function of said first alias datum and of at least one second alias datum, of the mobile terminal of the first user and of at least one mobile terminal of a second user for which said service has been selected, via said server of the provider of the selected communication service.

2. The linking method according to claim 1, wherein the user identifier linked to the mobile terminal of the first user or of the second user is an identifier linked to a user identification module of the mobile terminal of the first user or of the second user.

3. The linking method according to claim 1, wherein, said linking process being performed via an anonymous connection wireless network (4bis) connecting the mobile terminals to the platform, each process of obtaining at least one item of information of the location zone of at least one mobile terminal of a user comprises a process of identifying the user comprising the following process is performed by the platform:

determination of a temporary identification code linked to said alias datum;

transmission to the mobile terminal via said mobile network of said temporary identification code; and receipt via said anonymous connection wireless network of a message originating from the mobile terminal comprising said temporary identification code.

4. The linking method according to claim 1, comprising a transmission process to the mobile terminal of a user, following correct input of a USSD code or a short number by the user on his mobile terminal, of a message enabling connection of the mobile terminal to the platform.

5. The linking method according to claim 1, wherein obtaining location zone information of a terminal is triggered following detection of a connection of the mobile terminal to the platform or by receipt of a request message transmitted by the mobile terminal to obtain a list of available services from the platform.

6. The linking method according to claim 1, wherein the platform identifies an available service selected by a user of a mobile terminal by conducting the following processes:

transmission to the mobile terminal of a list of available services corresponding to the geographic zone where the mobile terminal is located; and receipt of an identification message of the selected service from among the available services, originating from the mobile terminal.

7. The linking method according to claim 1, wherein the linking process comprises matching of said first and second alias data with pseudonyms serving to identify said first and second users with the server of the provider of the selected service, the matching process being performed by the platform, and in that linking is performed using said pseudonyms.

8. The linking method according to claim 7, wherein the linking process comprises the following processes performed by the platform:

transmission to the server of the provider of the selected service of a request relative to the selected service comprising the pseudonyms linked to the mobile terminals of the first and second users;

receipt of data relative to the provision of said service originating from the server of the provider of the selected service, at least some of the data received being personalized for the users identified by the received pseudonyms; and transmission of data relative to the provision of said service to the mobile terminals of the first and second users.

9. The linking method according to claim 1, wherein the linking process comprises transmission by the platform to a server of the provider of the selected service of an alphanumeric code input by a user on his mobile terminal or else a code corresponding to an NFC beacon ("Near Field Communication"), a flashcode or an ebeacon read by the user via his mobile terminal so that said server of the service provider delivers to the user an associated service.

10. The linking method according to claim 1, wherein the linking process comprises at least one process implemented via the platform, from among a transmission process to the mobile terminal of the first or of the second user of email or text message originating from the server of the provider of the selected service and/or a setup process of voice communications with the mobile terminal of the first or of the second user.

11. The linking method according to claim 1, comprising a process for providing a user via the platform with a personal web page comprising personal information such as an email address, said personal information able to be updated by the user.

12. The linking method according to claim 1, wherein the data exchange between the platform and a service provider server is performed securely via a virtual private network (VPN) set up between the platform and the service provider server.

13. The linking method according to claim 1, wherein, each service also being linked to at least one item of information relative to the delivery period of said service:

determining at least one available first or second service, linked to at least one geographic availability zone in which the mobile terminal of the first or second user is located is a function also of information relative to the delivery period of said services; and linking, via the platform, of the mobile terminal of the first user and of at least one mobile terminal of a second user is carried out during the delivery period of said selected service.

14. A non-transitory computer readable medium having stored thereon code instructions for execution of a method for linking a mobile terminal of a first user and at least one mobile terminal of a second user via at least one server of a communications service provider via a platform configured to be connected to a mobile network, said mobile terminals being configured to be connected to the mobile network when said instructions are executed by a processor, wherein the method is performed by the platform having a list of at least one service, each service being linked to at least one geographic availability zone and comprises:

obtaining, via the mobile network, first information of the location zone of the mobile terminal of the first user and a first alias datum determined from a user identifier linked to the mobile terminal of the first user;

as a function of said first location information obtained, and of the list of services, determining at least one first geographically available first communications service, linked to at least one geographic availability zone in which the mobile terminal of the first user is located;

obtaining, via the mobile network, at least second information of the location zone of said at least one mobile terminal of the second user and of at least one second alias datum determined from a user identifier linked to the mobile terminal of the second user;

as a function of said obtained second location information, and of the list of services, determining at least one second geographically available communications service, linked to at least one geographic availability zone in which the mobile terminal of the second user is located; and selecting an identical geographically available service for the mobile terminal of the first user from among the first geographically available communication services and for at least one mobile terminal of the second user from among the second geographically available communication services, and linking, via the platform, as a function of said first alias datum and of at least one second alias datum, of the mobile terminal of the first user and of at least one mobile terminal of a second user for which said service has been selected, via said server of the provider of the selected communication service.

15. A platform configured to be connected to a mobile network and link a mobile terminal of a first user and at least one mobile terminal of a second user via at least one server of a communications service provider, said mobile terminals being configured to be connected to the mobile network, wherein it stores a list of services, each service being linked to at least one geographic availability zone and wherein it is configured to:

obtain via the mobile network, first information of the location zone of the mobile terminal of the first user and a first alias datum determined from a user identifier linked to the mobile terminal of the first user;

as a function of said first location information obtained, and of the list of services, determine at least one first geographically available communications service, linked to at least one geographic availability zone in which the mobile terminal of the first user is located;

obtain via the mobile network, at least second information of the location zone of said at least one mobile terminal of the second user and at least one second alias datum determined from a user identifier linked to the mobile terminal of the second user;

as a function of said second location information obtained, and of the list of services, determine at least one second geographically available communications service, linked to at least one geographic availability zone in which the mobile terminal of the second user is located; and select an identical geographically available service for the mobile terminal of the first user from among the first geographically available communication services and for at least one mobile terminal of the second user from among the second geographically available communication services, and linking, via the platform, as a function of said first alias datum and at least one second alias datum, the mobile terminal of the first user and the at least one mobile terminal of a second user for which said service has been selected, via said server of the provider of the selected communication service.

* * * * *